United States Patent [19]

Vidic et al.

[11] 3,897,306
[45] July 29, 1975

[54] 7-HYDROXY-Δ⁸-TETRAHYDROCANNABINOLS AND MICROBIOLOGICAL PRODUCTION THEREOF

[75] Inventors: Hans-Jorg Vidic; Klaus Kieslich; Karl Petzoldt, all of Berlin, Germany

[73] Assignee: Schering Aktiengesellschaft, Berlin, Germany

[22] Filed: July 3, 1974

[21] Appl. No.: 485,640

[30] Foreign Application Priority Data
July 6, 1973   Germany............................ 2335136

[52] U.S. Cl............................................ 195/51 R
[51] Int. Cl............................................ C12d 13/00
[58] Field of Search ................................... 195/51 R

[56] References Cited
UNITED STATES PATENTS
3,822,188   7/1974   Fager et al. ....................... 195/51 R Primary Examiner—Alvin E. Tanenholtz
Attorney, Agent, or Firm—Millen, Raptes & White

[57] ABSTRACT

7-Hydroxy-Δ⁸-tetrahydrocannabinols of the formula

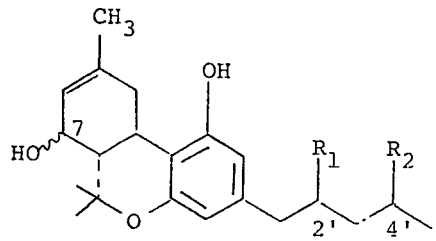

wherein $R_1$ and $R_2$ are both hydrogen atoms or one is a hydrogen atom and the other hydroxy process psychotropic activity and are produced by the microbiological hydroxylation of a corresponding 7-desoxy compound with a microorganism of the genus Streptomyces or Pellicularia.

10 Claims, No Drawings

7-HYDROXY-DELTA 8-TETRAHYDROCANNABINOLS AND MICROBIOLOGICAL PRODUCTION THEREOF

BACKGROUND OF THE INVENTION

This invention relates to 7-hydroxy-$\Delta^8$-tetrahydrocannabinols and the production thereof.

$\Delta^8$-Tetrahydrocannabinols hydroxylated in the 11- and in both the 7- and 11-positions have been known. They were discovered as metabolites of $\Delta^8$-tetrahydrocannabinol in metabolic investigations in animal and human experiments [Annals New York Academy of Sciences 191 (1971) 23–39]. However, the preparation of these compounds presents extreme difficulties.

In contrast thereto, it has now been found that hydroxyl groups can be introduced into the 7-, 7,2'- and 7,4'-positions, respectively, by microbiological conversions of $\Delta^8$-tetrahydrocannabinol.

SUMMARY OF THE INVENTION

In a composition aspect, this invention relates to novel 7-hydroxy-$\Delta^8$-tetrahydrocannabinols of the general formula

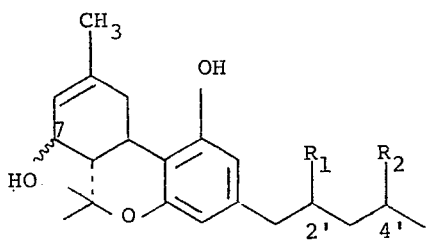

wherein the 7-hydroxy group is in the $\alpha$- or $\beta$-position and $R_1$ and $R_2$ each are hydrogen atoms or one is a hydrogen atom and the other is hydroxy.

In another composition aspect, this invention relates to a compound of this invention in admixture with a pharmaceutically acceptable carrier.

In a process aspect, this invention relates to a process for the production of $\Delta^8$-tetrahydrocannabinols hydroxylated in the 7-position by a microbiological method, which comprises subjecting $\Delta^8$-tetrahydrocannabinol to the oxygenating activity of the microorganism of the genus Streptomyces or Pellicularia.

DETAILED DISCUSSION

For a detailed description of the cultivation and fermentation of the microorganisms employed in the process of this invention, see, e.g., U.S. Pat. Nos. 2,773,878; 3,014,845; 3,014,846; and 3,040,038, whose disclosures are incorporated by reference.

Especially suitable microorganisms of the genus Streptomyces are S. lavendulae (ATCC 8664) and one of the genus Pellicularia, P. filamentosa f. sp. sasakii (ATCC 13289).

In the fermentation of $\Delta^8$-tetrahydrocannabinol with streptomyces lavendulae, 7$\alpha$-hydroxy-$\Delta^8$-tetrahydrocannabinol is formed as the primary product, while the products carrying an additional hydroxyl group in the 2'- or 4'-position of the pentyl chain are also produced in minor amounts.

In contrast thereto, during the fermentation with Pellicularia filamentosa f. sp. sasakii (ATCC 13289), 7$\beta$-hydroxy-$\Delta^8$-tetrahydrocannabinols are obtained which contain an additional hydroxyl group in the 2'- or 4'-position of the pentyl chain.

The microbiological hydroxylation is effected according to conventional methods. Thus, in generally customary preliminary tests, the most favorable fermentation conditions, such as, for example, the choice of the most favorable nutrient medium, the suitable substrate solvent, the substrate concentration, the technical conditions, e.g., temperature, aeration, pH and the optimum time periods for germination, substrate addition, and substrate contact on the enzyme of the microorganism are determined analytically, e.g., by thin-layer chromatography.

It is advantageous to employ substrate concentrations of about 50 – 1,000 mg. per liter of nutrient medium, preferably 80 – 250 mg. per liter. The pH is preferably adjusted to a value in the range of 4 to 7. The growth temperature is in the range of 20° C. to 40° C., preferably 25°–35° C. For aeration purposes, about 1 liter of air is introduced per minute and per liter of culture broth. The conversion of the substrate is suitably monitored by thin-layer chromatographic analysis of sample extracts. In general, adequate quantities of hydroxylated $\Delta^8$-tetrahydrocannabinols are formed after 50–100 hours.

The products of the process are isolated and purified in the conventional manner. For example, the products of the process can be extracted with an organic solvent, such as methyl isobutyl ketone, the extract can be evaporated, and the process products are separated and purified by column chromatography.

The novel 7-hydroxy-$\Delta^8$-tetrahydrocannabinols are useful as intermediates for the production of other cannabinols having psychotropic properties. They also possess valuable psychotropic effects themselves e.g., a psychic energizer in patients with general adynamy, apathy, lack of energy, loss of desire and lack of drive.

The compounds of the invention can be employed in mixture with conventional excipients, i.e., pharmaceutically acceptable organic or inorganic carrier substances suitable for parenteral, or oral application which do not deleteriously react with the active compounds.

For parenteral application particulary suitable are solutions, preferably oily solutions as well as suspensions or emulsions.

For oral application particularly suitable are tablets, dragees or capsules.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

Hydroxylation of $\Delta^8$-Tetrahydrocannabinol with

*Streptomyces lavendulae* ATCC 8664

Three Erlenmeyer flasks having a capacity of 2 liters and filled with respectively 500 ml. of a nutrient solution consisting of:

| | |
|---|---|
| glucose | 1.5 % |
| CORN STEEP LIQUOR | 0.1 % |
| peptone | 0.1 % |
| yeast extract | 0.1 % | with a pH of about 6.8 were inoculated with the supernatant broth of a culture of *S. lavendulae* grown for one week on an agar slant. After 3 days of growth on a rotary vibrator at 30° C., the mycelium suspension was utilized as the inoculum for the inoculation of 20 two-liter Erlenmeyer flasks containing respectively 500 ml. of the same nutrient medium.

After a growth of 17 hours, 2.5 ml. of a solution of 1 g. of $\Delta^8$-tetrahydrocannabinol in 50 ml. of ethanol was added to each flask. At varying times, samples were withdrawn from respectively two flasks, extracted, and examined with respect to the degree of conversion with the aid of thin-layer chromatography.

After an incubation period of 89 hours, the optimum of the conversion had been reached, and the flasks were worked up as follows: The entire suspension was extracted three times with respectively 1.5 l. of methyl isobutyl ketone. The combined extracts were dried and evaporated under vacuum, thus obtaining 1.2 g. of a brown oil, which was separated by column chromatography over 50 g. of silica gel with a solvent gradient of 2 l. of chloroform + 2 l. of chloroform-methanol (97 + 3).

The following fractions were obtained:
III 130 mg. of 7α-hydroxy-$\Delta^8$-tetrahydrocannabinol,
V 76 mg. of 7α,2'-dihydroxy-$\Delta^8$-tetrahydrocannabinol,
VI 48 mg. of 7α,4'-dihydroxy-$\Delta^8$-tetrahydrocannabinol.

$R_F$ values on analytical instant silica gel plates (Merck F 254):

(a) system ether/hexane 1 + 1
(b) system ether/hexane 5 + 1
(c) system chloroform/methanol (with chamber saturation)

| | |
|---|---|
| 7 α-hydroxy-$\Delta^8$-tetrahydrocannabinol | (a) $R_F = 0.4$ |
| 7 α,2'-dihydroxy-$\Delta^8$-tetrahydrocannabinol | (b) $R_F = 0.45$ (c) 0.5 |
| 7 α,4'-dihydroxy-$\Delta^8$-tetrahydrocannabinol | (b) $R_F = 0.33$ (c) 0.42 |

EXAMPLE 2

Hydroxylation of $\Delta^8$-Tetrahydrocannabinol with *Pellicularia filamentosa* f. sp. *sasakii* ATCC 13 289

The procedure of Example 1 was followed, but a nutrient medium was used having the following composition:

| | | | |
|---|---|---|---|
| glucose | 3 % | NaNO₃ | 0.2 % |
| corn steep liquor | 2 % | KH₂PO₄ | 0.2 % |
| peptone | 0.5 % | MgSO₄ | 0.05 % |
| yeast extract | 0.5 % | FeSO₄ | 0.02 % |
| pH: 4.5 – 5.0 | | | |

In this case, the substrate was added after a growth time of 3 hours.

After a fermentation period of 68 hours, the batches were worked up, after sampling by the thin-layer method.

The mycelium was filtered off through gauze and washed three times with 0.5 l. of methyl isobutyl ketone. The filtrate was extracted three times with respectively 1.5 l. of methyl isobutyl ketone. The combined organic extracts were treated as set forth above, thus obtaining 1.17 g. of a brown oil, separated over 120 g. of silica gel with a solvent gradient of 3 l. of hexane + 3 l. of hexane/acetone 2 + 1. In addition to other metabolites, 170 mg. of a crude mixture of two compounds was obtained, which was separated by way of a preparative thin-layer plate (silica gel) with ethyl acetate.

7β,2'-dihydroxy-$\Delta^8$-tetrahydrocannabinol
7β,4'-dihydroxy-$\Delta^8$-tetrahydrocannabinol.

$R_F$ values in the systems:
(a) ether/hexane 3 + 1
(b) chloroform/methanol 6 + 1 (with chamber saturation).

| | |
|---|---|
| 7 β,2'-dihydroxy-$\Delta^8$-tetrahydrocannabinol | (a) 0.3 (b) 0.45 |
| 7 β,4'-dihydroxy-$\Delta^8$-tetrahydrocannabinol | (a) 0.24 (b) 0.42 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of $\Delta^8$-tetrahydrocannabinols of the formula

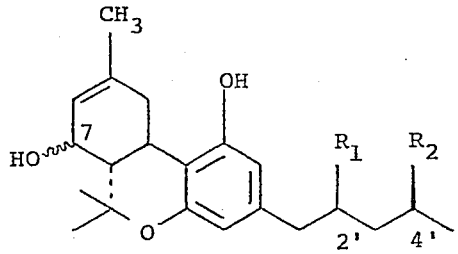

wherein $R_1$ and $R_2$ each are hydrogen atoms or one is a hydrogen atom and the other is a hydroxy, which comprises subjecting a corresponding 7-desoxy-$\Delta^8$-tetrahydrocannabinol to the oxygenating activity of a microorganism of the genus Streptomyces or Pellicularia.

2. A process of claim 1 wherein the reaction product is 7α-hydroxy-$\Delta^8$-tetrahydrocannabinol.

3. A process of claim 1 wherein the reaction product is 7α,2'-dihydroxy-$\Delta^8$-tetrahydrocannabinol.

4. A process of claim 1 wherein the reaction product is 7α,4'-dihydroxy-$\Delta^8$-tetrahydrocannabinol.

5. A process of claim 1 wherein the reaction product is 7β,2'-dihydroxy-$\Delta^8$-tetrahydrocannabinol.

6. A process of claim 1 wherein the reaction product is 7β,4'-dihydroxy-$\Delta^8$-tetrahydrocannabinol.

7. A process according to claim 1, wherein the microorganism is *Streptomyces lavendulae* ATCC 8664.

8. A process according to claim 1, wherein the microorganism is *Pellicularia filamentosa* f. sp. *sasakii* ATCC 13289.

9. A process according to claim 1 wherein the microorganism is of the genus Streptomyces.

10. A process according to claim 1 wherein the microorganism is of the genus Pellicularia.

* * * * *